United States Patent [19]

Usui et al.

[11] Patent Number: 5,007,742
[45] Date of Patent: Apr. 16, 1991

[54] TEMPERATURE-SENSING MEMBER

[75] Inventors: Masayoshi Usui, Numazu; Hiroshi Kanesaka, Kawasaki, both of Japan

[73] Assignee: Usui Kokusai Sangyo Kaisha Limited, Japan

[21] Appl. No.: 452,820

[22] Filed: Dec. 19, 1989

[30] Foreign Application Priority Data

Dec. 27, 1988 [JP] Japan ................................. 63-330620

[51] Int. Cl.$^5$ ......................... G01K 5/62; G01K 13/00
[52] U.S. Cl. ..................................... 374/136; 374/153; 374/205; 415/12; 416/39
[58] Field of Search ............... 374/206, 207, 204, 195, 374/187, 136; 60/527; 416/36, 39; 415/12

[56] References Cited

U.S. PATENT DOCUMENTS

| 359,210 | 3/1887 | Haight | 374/195 |
| 2,065,703 | 12/1936 | Hubbard | 374/195 |
| 3,038,337 | 6/1962 | Diefendorf | 374/187 |
| 3,040,580 | 6/1962 | Stover et al. | 374/207 |
| 4,261,174 | 4/1981 | Wagstaffe | 374/187 X |
| 4,325,217 | 4/1982 | Golestaneh | 60/527 |
| 4,778,339 | 10/1988 | Usui et al. | 416/39 |

Primary Examiner—Daniel M. Yasich
Attorney, Agent, or Firm—Anthony J. Casella; Gerald E. Hespos

[57] ABSTRACT

Disclosed is a temperature-sensing member including a columnar or hollow cylindrical base having a configuration of a circular or polygonal column or a hollow circular or polygonal cylinder; and at least one strip member of a material having a different coefficient of thermal expansion from that of the base, wherein the strip member is provided on at least a portion of an outer peripheral surface of the base at an acute angle with respect to an axis of the base and in such directions as to intersect each other on opposite sides of the base. In a case where two or more of the strip members are provided on the base, the strip members are disposed in mutually different directions with respect to an axis of the base and at an acute angle with respect to the base. The base may be formed into a tubular base having a rectangular, polygonal, circular configuration, in which case the strip member is provided on at least a portion of each opposite side of the base at an acute angle with respect to a breadthwise central line of the base in such a manner as to be oriented toward different directions. The strip member may be formed into a configuration of a belt, wire, or rod.

13 Claims, 3 Drawing Sheets

TEMPERATURE-SENSING MEMBER

BACKGROUND OF THE INVENTION

1. Field of the Invention

The present invention relates to a temperature-sensing member for measuring the temperature of a fluid which is disposed in such as a channel of a fluid or the interior of a storage tank in, for instance, a machine, an appliance, equipment, or the like and is adapted to sense the temperature of the fluid so as to indicate the temperature or control the channel.

2. Description of the Related Art

Conventionally, a temperature sensing member of this type has generally been composed of a bimetal in which materials having different coefficients of thermal expansion are adhered to each other.

With such a conventional temperature-sensing member, however, since it is arranged as described above, the bimetal only bends (warps) with respect to a temperature change, and its motion does not directly lead to rotational movement. Therefore, an arrangement must be provided such that a rack and a pinion or a similar other converting mechanism is interposed so as to indicate the temperature on a scale. In addition, there have been problems in that since it is made of metals, if the conventional temperature-sensing member is used in a corrosive fluid or its environment, trouble can occur, causing a hindrance to its use over extended periods of time, and that it is often difficult to form the conventional temperature-sensing member into such a configuration that is suited to a portion of an apparatus where it is installed.

SUMMARY OF THE INVENTION

Accordingly, an object of the present invention is to provide a temperature-sensing member which is capable of fetching a temperature change directly as torsional or rotational movement without requiring the aforementioned converting mechanism, of being used in a corrosive fluid or its environment so as to permit its use over extended periods of time, and of being formed freely into a configuration which is suited to a portion of an apparatus where it is installed.

To this end, in accordance with one aspect of the present invention, there is provided a temperature-sensing member comprising: a columnar or hollow cylindrical base having a configuration of a circular or polygonal column or a hollow circular or polygonal cylinder; and at least one strip member of a material having a different coefficient of thermal expansion from that of said base, wherein said strip member is provided on at least a portion of an outer peripheral surface of said base at an acute angle with respect to an axis of said base and in such directions as to intersect each other on opposite sides of said base. In a case where two or more of the strip members are provided on the base, the strip members are disposed in mutually different directions with respect to an axis of the base and at an acute angle with respect to the base.

In accordance with another aspect of the invention, there is provided a temperature-sensing member comprising: a tabular base having a rectangular, polygonal, circular configuration; and at least one strip member of a material having a different coefficient of thermal expansion from that of said base, wherein said strip member is provided on at least a portion of each opposite side of said base at an acute angle with respect to a breadthwise central line of said base in such a manner as to be oriented toward different directions.

The strip member is formed into a configuration of a belt, wire, or rod.

By virtue of the above-described arrangement in which the strip member or members which are formed of a material having a different coefficient of thermal expansion from that of the base and are disposed by being inclined or wound therearound, at the time of sensing the temperature the base in its installed state undergoes displacement in a direction of torsion (rotating direction) of the base about a breadthwise central line or an axis thereof. Accordingly, the torsional displacement of the base about the central line or the axis can be converted directly into motion for reading the scale or controlling the channel without any interposition of a converting mechanism. In addition, since the members of the temperature-sensing member can be formed of a material other than a metal such as a resin or glass fibers, it is possible to use the temperature-sensing member in a corrosive fluid or its environment without any hindrance, so that the temperature-sensing member can be used for extended periods of time. Furthermore, thanks to the basic configuration of the base whose transverse or longitudinal length or diameter can be formed freely, it is possible to arrange the temperature-sensing member in conformity with a portion of an apparatus in which it is installed.

The above and other objects, features and advantages of the present invention will become more apparent from the following detailed description of the invention when read in conjunction with the accompanying drawings.

BRIEF DESCRIPTION OF THE DRAWINGS

FIG. 1a is a top plan view of FIG. 1;

DETAILED DESCRIPTION OF THE PREFERRED EMBODIMENTS

Figure 1:
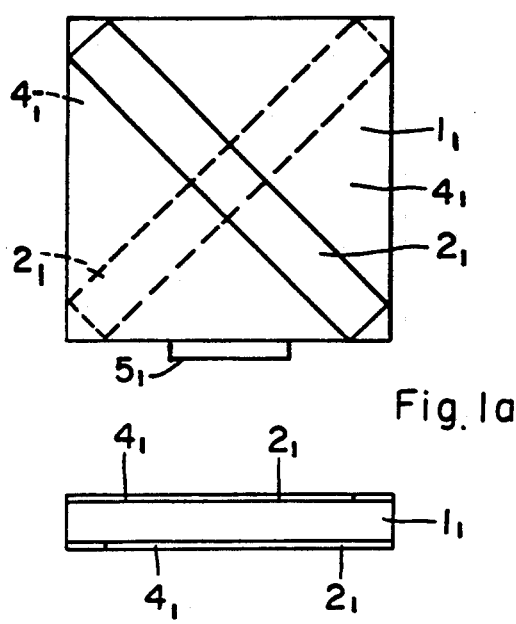
FIG. 1 is a top plan view of a temperature-sensing member in accordance with an embodiment of the present invention.
Figure 2:
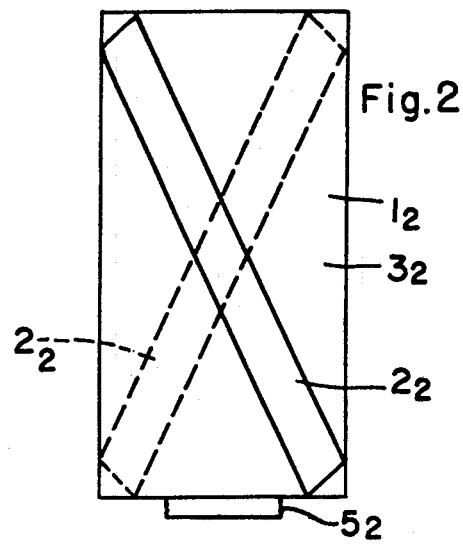
FIG. 2 is a diagram illustrating another embodiment and corresponding to FIG. 1.
Figure 3:
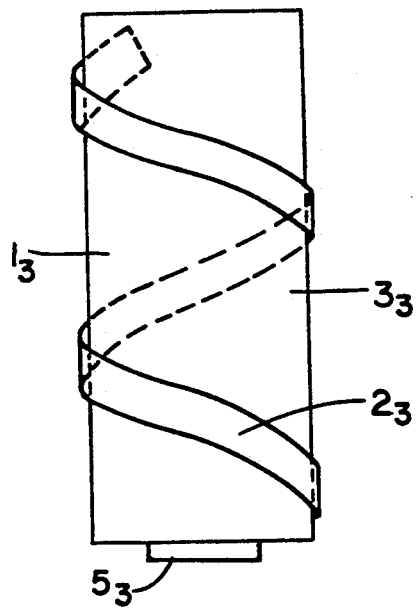
FIG. 3 is a diagram illustrating still another embodiment and corresponding to FIG. 1.
Figure 2A:
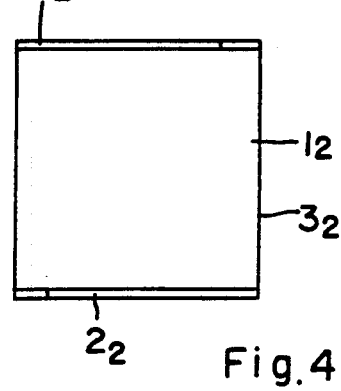
FIG. 2a is a top plan view of FIG. 2.
Figure 3A:
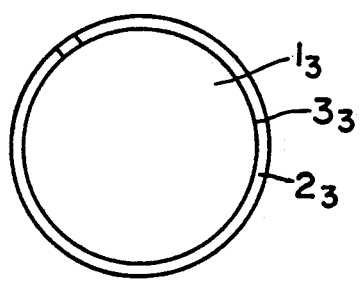
FIG. 3a is a top plan view of FIG. 3.
Figure 4:
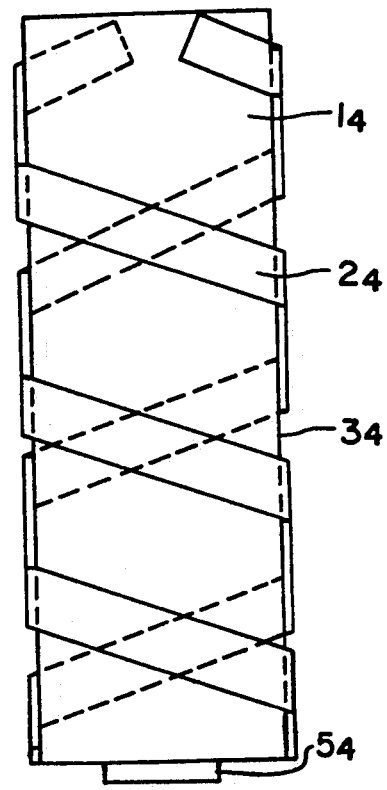
FIG. 4 is a diagram illustrating still another embodiment and corresponding to FIG. 1.
Figure 5:
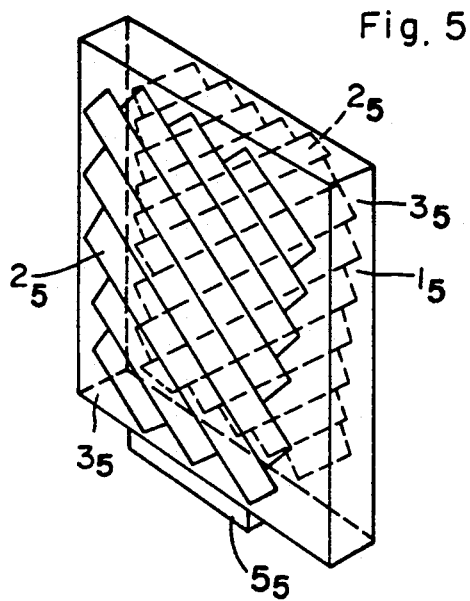
FIG. 5 is a perspective view of a further embodiment.
Figure 4A:
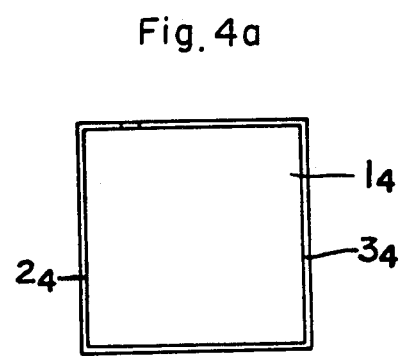
FIG. 4a is a top plan view of FIG. 4.
Figure 6:
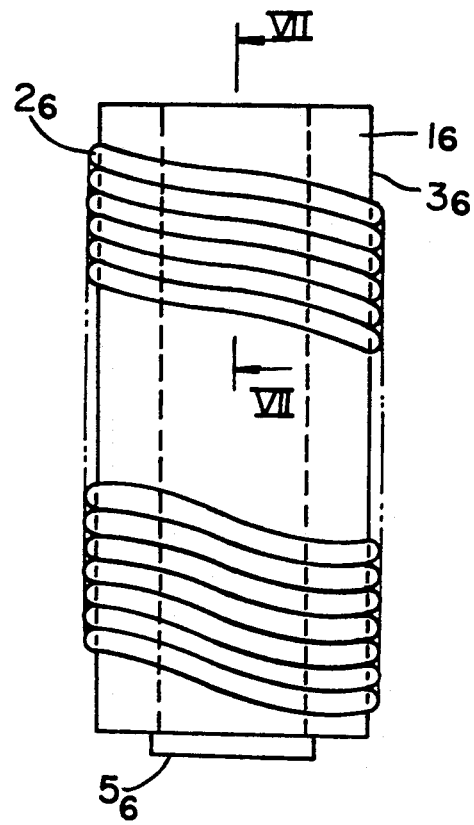
FIG. 6 is a front elevational view of a still further embodiment.
Figure 7:
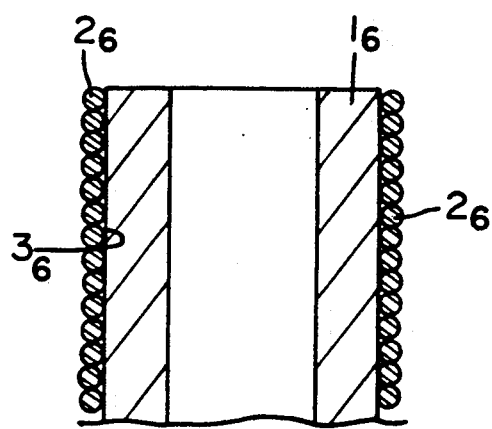
FIG. 7 is a cross-sectional view taken along the line VII—VII of FIG. 6.

Referring to FIGS. 1 to 7, a base $1_1$–$1_6$ is constituted by a tabular member, $1_1$ in FIGS. 1 and 1a, having a rectangular, polygonal, or circular configuration, a columnar member having a configuration of a circular column, $1_3$ in FIGS. 3 and 3a, or a polygonal column FIGS. 2 and 2a or $1_4$ in FIGS. 4 and 4a, a hollow cylindrical member, $1_6$ in FIGS. 6 and 7, having a configuration of a circular cylinder or a polygonal cylinder, or other similar member, such a member constituting the base $1_1$–$1_6$ being formed of a resin such as rigid polyvinyl chloride resin, polyurethane resin, or polypropylene resin. A strip member $2_1$–$2_6$ is formed of a material having a different coefficient of thermal expansion from that of the substrate $1_1$–$1_6$, and may be configured into a belt, a wire, or a rod. As for its material, the strip member $2_1$–$2_6$ may be formed of, for instance, glass fibers, carbon fibers, a metal strip, a metal wire, aramid fibers, or the like. This strip member or members $2_1$–$2_6$ are secured to the base $1_1$–$1_6$ by being adhered to the surface or surfaces of the base by casting or by means of an adhesive or the like such that the strip member or members $2_1$–$2_6$ each formed of at least one of the aforementioned materials is disposed on at least a portion of each opposite surface 4 or an outer peripheral surface $3_2$–$3_6$ of the base $1_2$–$1_6$ at mutually opposing positions on opposite surfaces or the outer peripheral surface thereof by being inclined or wound therearound at an acute angle in mutually different directions with respect to a breadthwise central line or an axis of the base $1_1$–$1_6$. As described above, the coefficient of thermal expansion of the base $1_1$–$1_6$ differs from that of the strip member $2_1$–$2_6$. However, an arrangement is provided such that the base $1_1$–$1_6$ has a larger coefficient of thermal expansion than that of the strip member $2_2$–$2_6$. By virtue of the arrangement in which the strip member or members $2_2$–$2_6$ are secured to the base $1_1$–$1_6$ by being inclined on opposite surfaces of the base or wound around its outer peripheral surface, at the time of sensing the temperature the base in its installed state undergoes displacement in a direction of torsion (rotating direction) of the base about a breadthwise central line or an axis thereof. Furthermore, as shown in FIGS. 5 to 7, the strip member or members $2_1$–$2_6$ may be provided on a substantially entire surface or surfaces of the base $1_1$–$1_6$.

Figure 8:
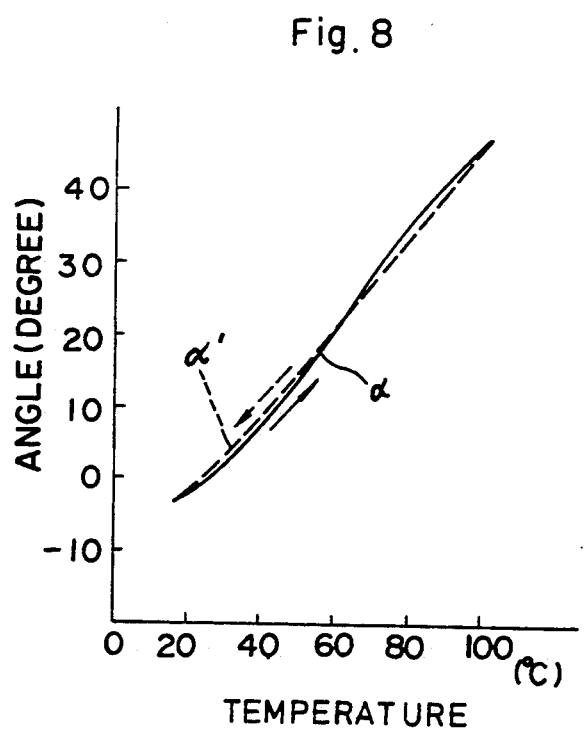
FIG. 8 is a characteristic curve diagram of a temperature-sensing member constituted by a tabular base in accordance with an embodiment of the present invention.
Figure 9:
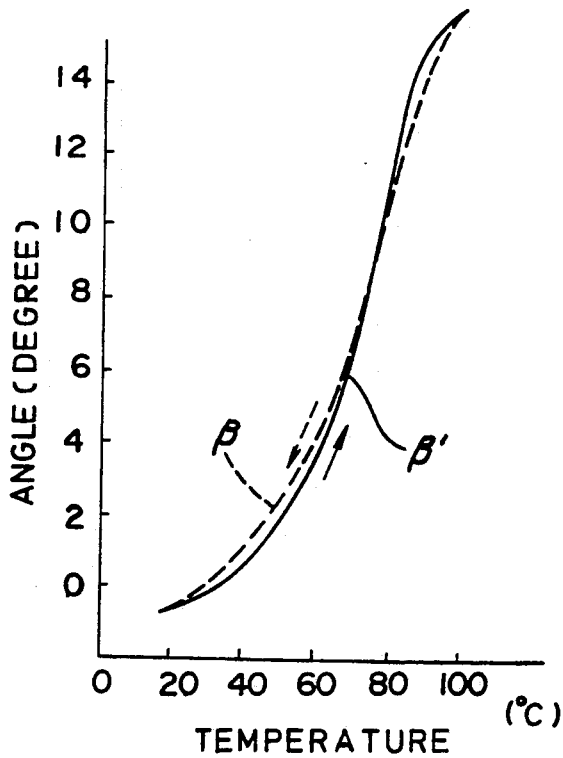
FIG. 9 is a characteristic curve diagram of a temperature-sensing member constituted by a tubular base.

A temperature indicating means $3_1$–$3_6$ is disposed at one end of the base $1_1$–$1_6$ for directly indicating temperature in view of the torsional displacement of the base $1_1$–$1_6$. In actual use, the ambient temperature is directly which may be in the form indicated by the indicating means $5_1$–$5_6$ or a channel is controlled by the indicating means $5_1$–$5_6$ which may be in the form of a needle member, a valve, or the like disposed at a distal end of the base without using any converting mechanism. FIGS. 8 and 9 are characteristic curve diagrams illustrating the relationships between the temperature (°C.) of the base $1_1$–$1_6$ of the temperature-sensing member in accordance with the embodiment of the present invention and an angle (degrees) due to the displacement of the base in the direction of torsion (rotating direction) thereof. In the graphs, $\alpha$ indicates the case of the base $1_1$–$1_6$ formed of a tabular member, and $\beta$ the case of the base $1_1$–$1_6$ formed of a cylindrical member, while $\alpha'$ and $\beta'$ indicate the states of restoration in the respective cases.

As described above, the temperature-sensing member for measuring the temperature of a fluid or for other similar purposes in accordance with the present invention comprises the base $1_1$–$1_6$ and the strip member or members $2_1$–$2_6$ which are formed of a material having a different coefficient of thermal expansion from that of the base $1_1$–$1_6$ and are secured to the opposite surfaces $4_1$ or the outer peripheral surface $3_2$–$3_6$ of the base by being inclined or wound therearound in mutually different directions and at an acute angle. Accordingly, in the state in which the temperature-sensing member is used for sensing the temperature, the displacement of the base $1_1$–$1_6$ about the central line or the axis in the direction of torsion thereof takes place more effectively as compared with the conventional temperature-sensing member. Hence, the torsional displacement about the central line or the axis can be converted directly into motion for reading the scale or controlling the channel without any interposition of a converting mechanism, so that the range of application of the temperature-sensing member can be enlarged. In addition, as the material is selected appropriately, it is possible to use the temperature-sensing member in a corrosive fluid or its environment without any hindrance, so that the temperature-sensing member can be used for extended periods of time. Furthermore, thanks to the configuration of the base $1_1$–$1_6$ whose transverse or longitudinal length or diameter can be formed freely, it is possible to arrange the temperature-sensing member in conformity with a portion of an apparatus in which it is installed. Thus, the temperature-sensing member in accordance with the present invention is extremely useful.

What is claimed is:

1. A temperature-sensing member for directly indicating magnitudes of temperature changes of a fluid, comprising:

a columnar base having a longitudinal axis, opposed ends and an outer surface extending between the opposed ends, the outer surface defining at least first and second opposed surface areas extending longitudinally between the opposed ends, said base being formed from a first material having a coefficient of thermal expansion; and at least one strip member of a second material having a coefficient of thermal expansion different from that of said base, said strip member being secured directly on at least the first and second opposed surface areas of the outer surface of said base at acute angles with respect to the longitudinal axis of said base, portions of the strip member on the first surface area being angularly offset in a first direction relative to the longitudinal axis, and portions of the strip member on the second surface area being angularly offset in an opposed direction relative to the axis, such that the opposed ends of the base twist relative to one another in response to changes of temperature;

temperature indicating means mounted in proximity to one said end of the base for providing a direct indication of the magnitude of the temperature change.

2. A temperature-sensing member according to claim 1, wherein said strip member is formed into a configuration of a belt.

3. A temperature-sensing member according to claim 1, wherein said base is circular in cross-section.

4. A temperature-sensing member according to claim 1, wherein said at least one strip member comprises a plurality of strip members on said base oriented in mutually different direction with respect to the axis of said base and disposed at acute angles 5. A temperature sensing member according to claim 1 wherein the base is formed from a resin.

6. A temperature sensing member according to claim 5 wherein the resin of the base is selected from the group consisting of rigid polyvinyl chloride resin, polyurethane resin and polypropylene resin.

7. A temperature sensing member according to claim 5 wherein the strip member is formed from a non-metallic material.

8. A temperature sensing member according to claim 7 wherein the strip member is formed from a non-metallic material selected from a group consisting of glass fibers, carbon fibers and aramid fibers.

9. A temperature sensing member as in claim 1 wherein the strip member is secured to the base by casting.

10. A temperature sensing member as in claim 1 wherein the strip member is formed from metal.

11. A temperature-sensing member for directly indicating magnitudes of temperature changes of a fluid comprising:
- a base having opposed ends and a longitudinal axis extending therebetween, said base being hollow along the longitudinal axis and having opposite external surface areas extending between the ends, said base being formed from a first material having a coefficient of thermal expansion; and
- at least one strip member of a second material having a coefficient of thermal expansion different from that of said base,
- wherein said strip member is provided on at least a portion each said opposite surface area of said base at an acute angle with respect to the longitudinal axis of said base in such a manner as to be oriented toward different directions on each of the respective opposite surface areas of the base, and
- temperature indicating means mounted in proximity to one said end of the base, whereby the opposed ends of the base twist relative to one another in response to changes of temperature, with the temperature indicating means providing a direct indication of the magnitude of the temperature change.

12. A temperature-sensing member according to claim 11, wherein said strip member is formed into a configuration of a belt.

13. A temperature-sending member according to claim 1, wherein said base is formed into a polygonal cross-sectional configuration.

* * * * *